8716X
L. Steere.
Window Shutter.
No.
Patented Mar. 26, 1835.
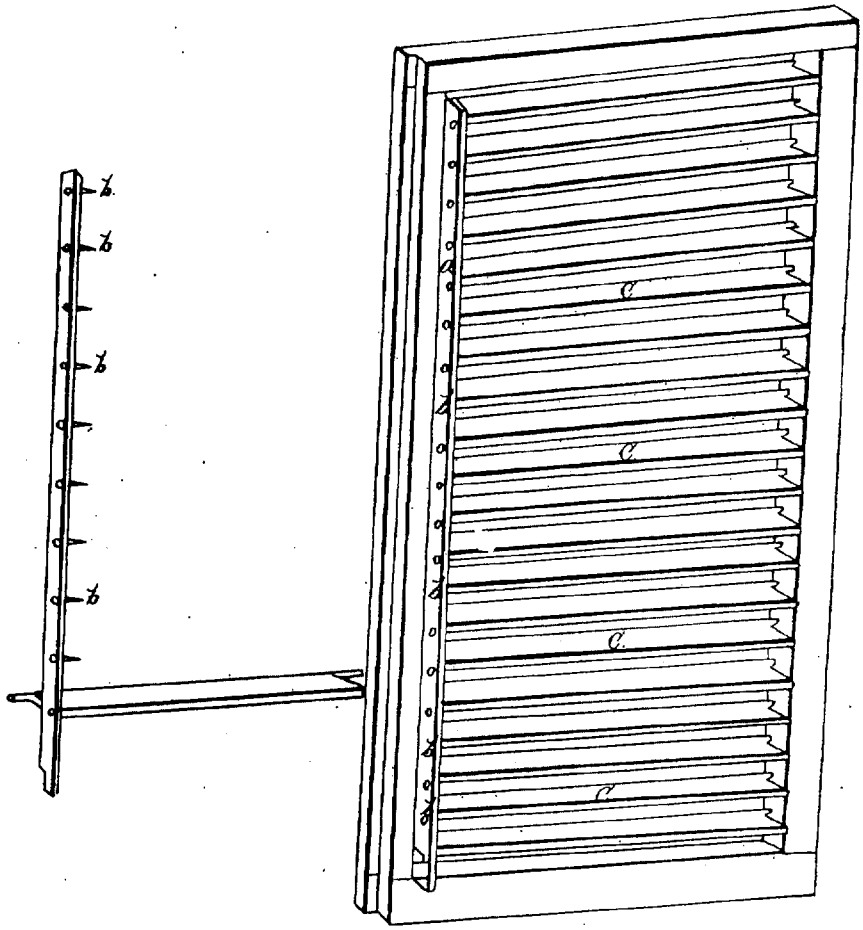
THE GRAPHIC CO. PHOTO-LITH. 39 & 41 PARK PLACE, N.Y.

Mar 25 1835 8716X 3/25/1835 [illegible]

Davis Steere Glocester R.I.

Letters Patent

The Schedule referred to in these Letters Patent and making part of the same containing a description in the words of the said Davis Steere himself of his Improvement in [illegible] blinds for doors windows &c Be it remembered that Davis Steere of Glocester in the County of Providence and State of Rhode Island &c have invented a new and useful Improvement in [illegible] blinds for doors windows &c which may be thus specified The [illegible] blinds now in ordinary use the slats are turned by a rod in the [illegible] of them. The inner edge of each slat is fas[tened] to the rod by a [illegible] [illegible] and in the middle & upper rail a [illegible] [illegible] around them a place is cut [illegible] which the end of the rod [illegible] when the slats are laid flat or closed. The slats are turned by moving this rod up and down. This Improvement consists in dispensing with the rod [illegible] connexion with the slats and substituting in its place what I call a guide on the [illegible] or inner side of the blind. This guide is a thin [illegible] of light metal or hard wood say one eighth of an inch in thickness & of [illegible] and [illegible] enough to ensure sufficient stiffness and strength to turn the slats. It is attached to one end of every slat between each [illegible] in the blind by a pin or [illegible] of wood or metal that [illegible] into or through into the slat near the inner edge of the slat, on this pin or [illegible] each slat turns as the slats are opened or closed. The guide is between the end of the slats to which it is attached and the styles or mouldings to which they [illegible] and its outer edge is so shaped that it will not interfere with the turning of the slats. All the slats attached to each guide are turned by [illegible] [illegible] the guide up and down or by turning any one of the slats. When the [illegible] [illegible] flat and closed by inserting a pin or other fastening [illegible] the [illegible] [illegible] [illegible] from the outside of the blind [illegible] the [illegible] [illegible] [illegible] the [illegible] [illegible] opened or turned by any person on the [illegible] of the blind. The advantages of this Improvement are that blinds 8 (160X)

[illegible] to get out the plan and can make a drawing of the purpose of a lever outside shutter.

I claim the foregoing the guide plane and connected with the slat as my invention. Witness March 4 1835

Stephen Moore

Witness
Geo. Leon J. Esten
William C. Stiles

[510.W85]